Nov. 6, 1962    J. J. FRANK    3,061,838
APPARATUS FOR SEALING STUFFED FLEXIBLE CASINGS
Filed April 24, 1958    6 Sheets-Sheet 1

INVENTOR.
JOSEPH J. FRANK
BY
*Bauer and Seymour*
ATTORNEYS

Nov. 6, 1962  J. J. FRANK  3,061,838
APPARATUS FOR SEALING STUFFED FLEXIBLE CASINGS
Filed April 24, 1958  6 Sheets-Sheet 2
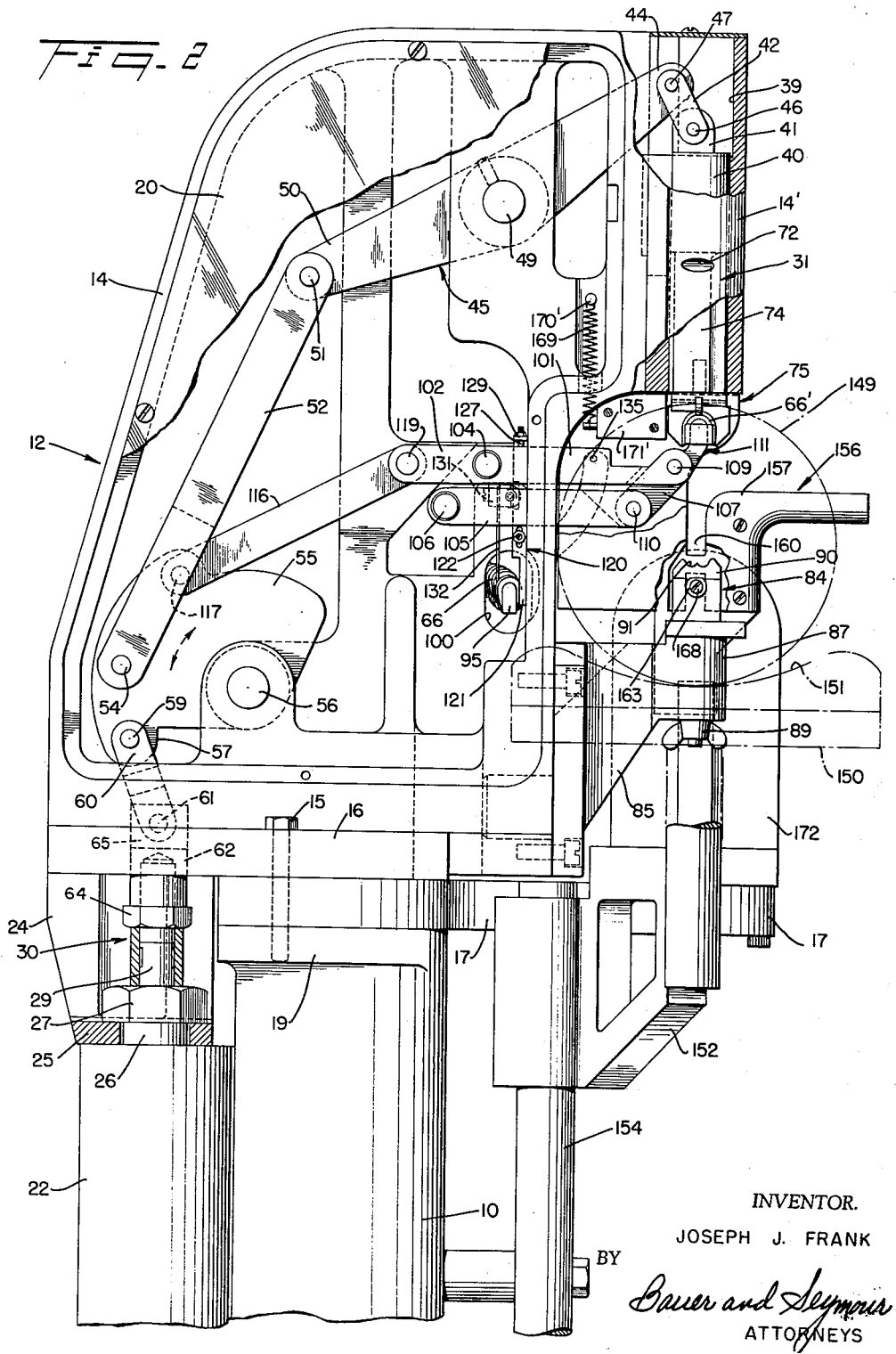
INVENTOR.
JOSEPH J. FRANK
BY
Bauer and Seymour
ATTORNEYS

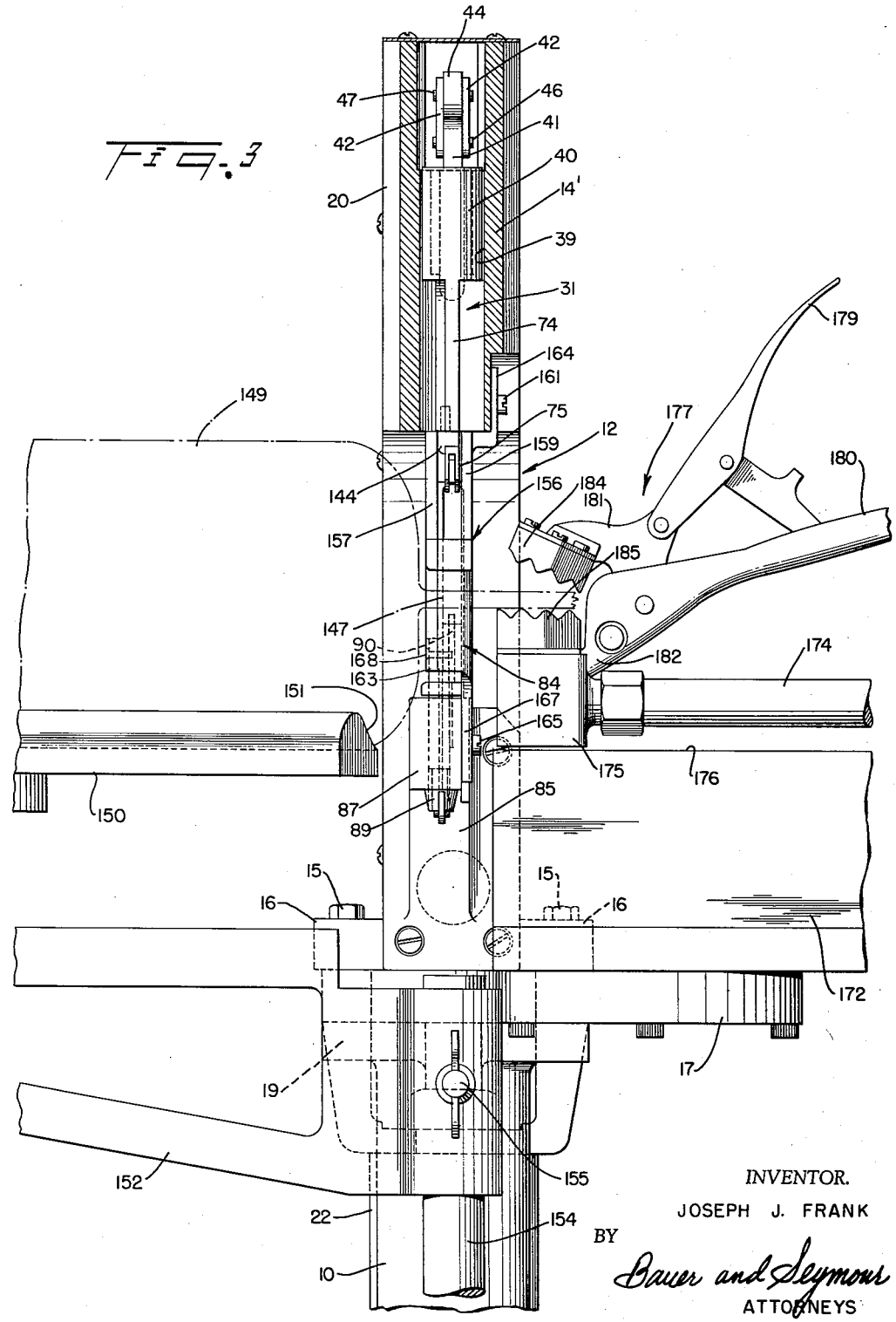

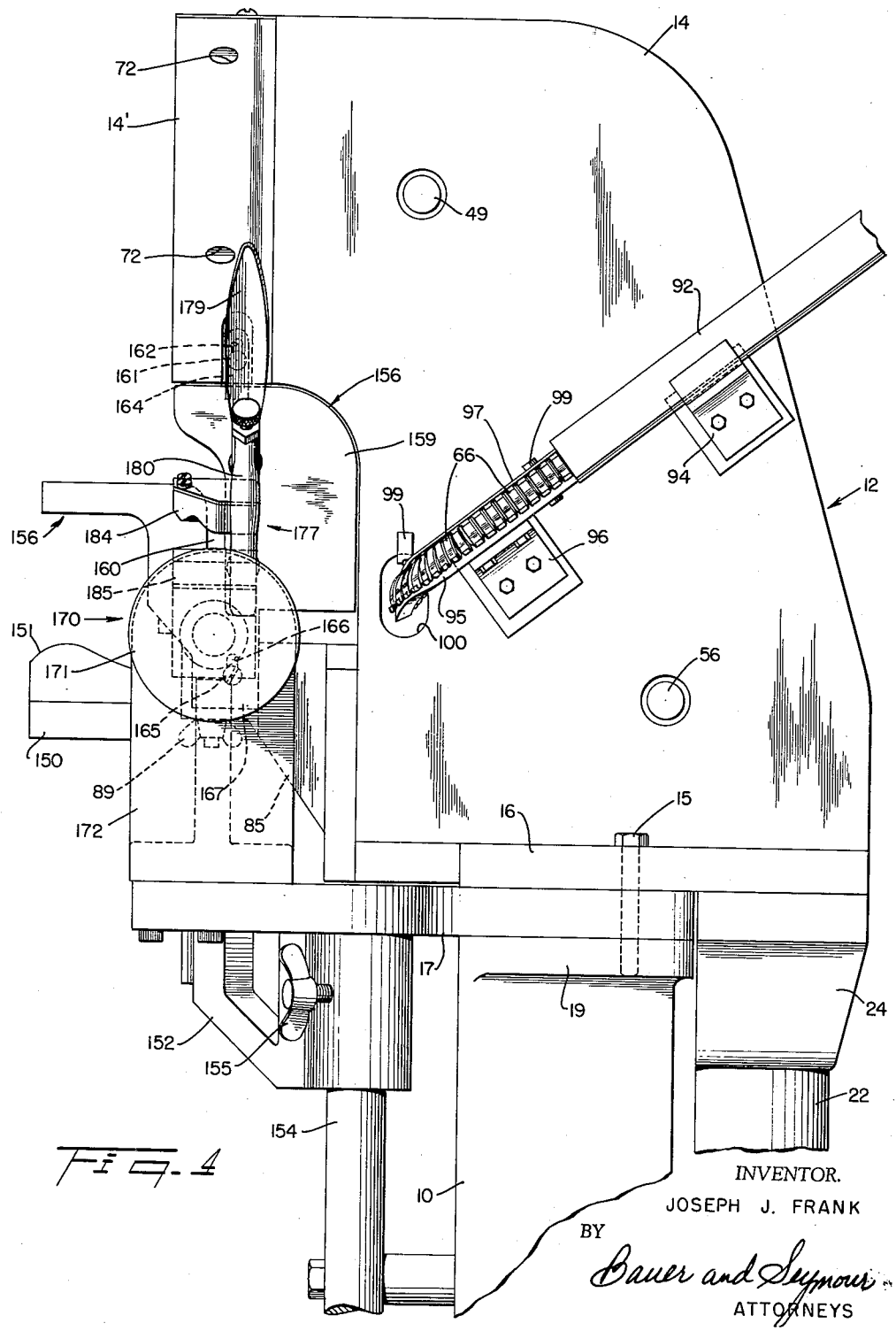

Nov. 6, 1962 J. J. FRANK 3,061,838
APPARATUS FOR SEALING STUFFED FLEXIBLE CASINGS
Filed April 24, 1958 6 Sheets-Sheet 5
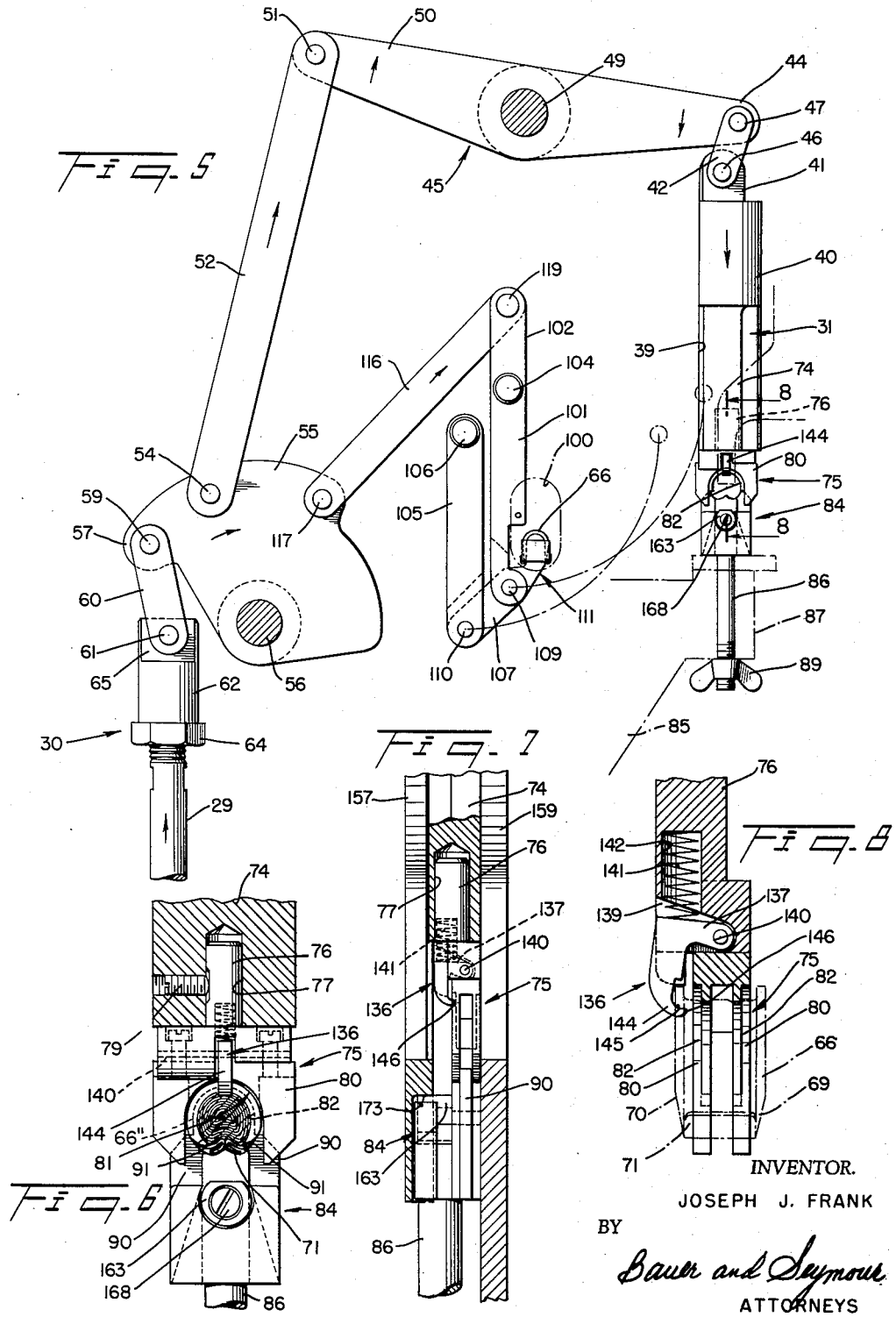
INVENTOR.
JOSEPH J. FRANK
BY
Bauer and Seymour
ATTORNEYS

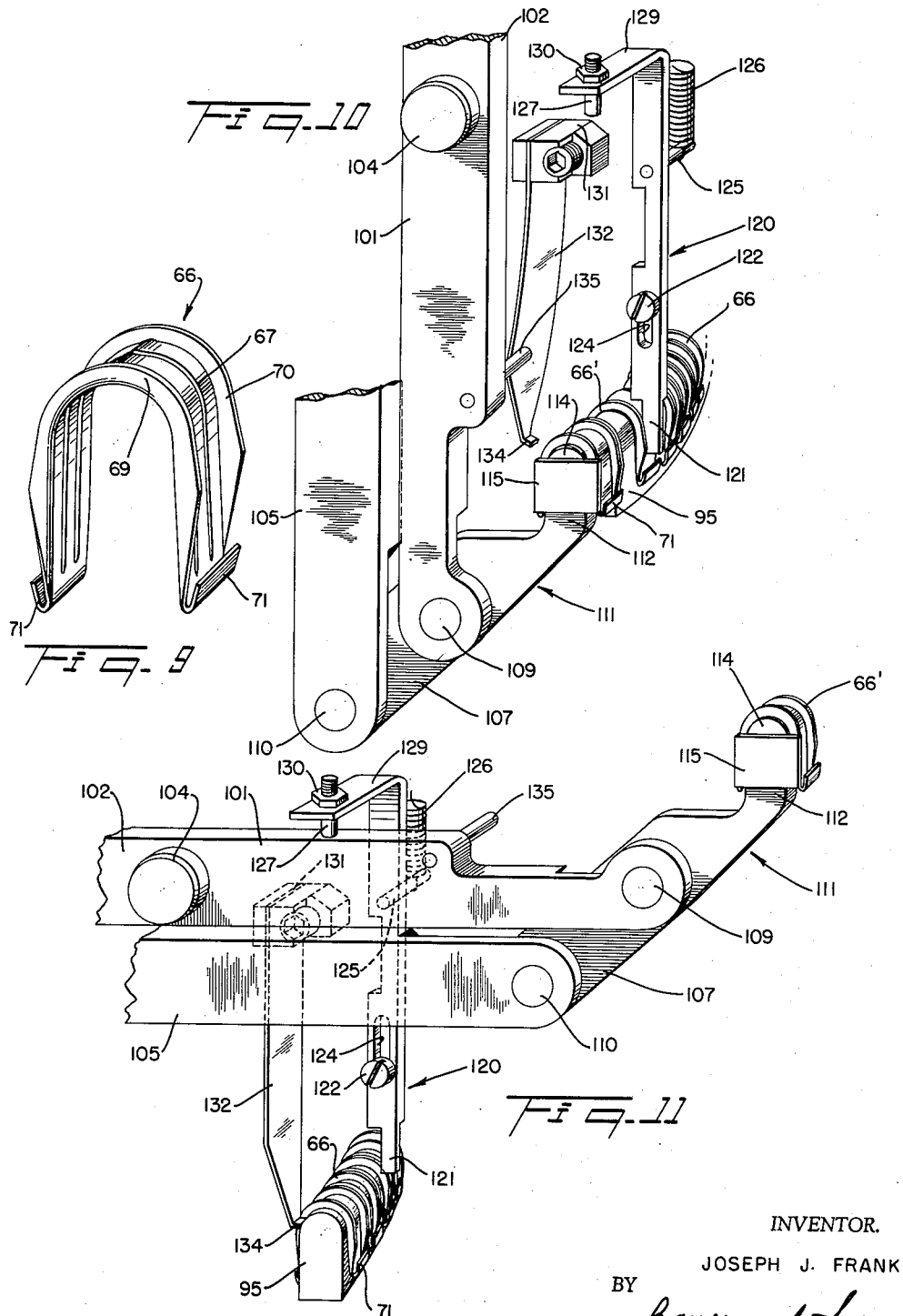

United States Patent Office 3,061,838
Patented Nov. 6, 1962

3,061,838
APPARATUS FOR SEALING STUFFED
FLEXIBLE CASINGS
Joseph J. Frank, 401 Osborne Ave., Brielle, N.J.
Filed Apr. 24, 1958, Ser. No. 730,660
8 Claims. (Cl. 1—329)

This invention relates to a means for sealing the end of a stuffed flexible casing. The invention is particularly advantageous in the manufacture of sausages, of encased smoked meats, and other meat products. It is also useful in sealing the ends of flexible casings which are stuffed with any kind of soft, or loose, or comminuted, or deformable, or compressible materials. We include all such encased products, held within a sealed flexible casing, within the general term sausage for lack of a one word generic term of better connotation. The invention will be described in this application to the manufacture of a meat sausage, but it is to be understood that the specific description is not a limitation on the generality of uses to which the invention may be put.

Sausages are made of ground or rolled or smoked meat, the method involving the use of a flexible tube of appropriate length which is sealed at one end by pleating the end and tying it. The casing is then opened at the opposite end, slid over a stuffing horn and stuffed with the meat product. The second, initially open end is then withdrawn from the horn and sealed. The sealing of the second end, which is done after the stuffing operation, involves the problems of removing the air from the casing, securing a snug fit of the casing against the end of the food content, and fitting the fastener to the end of the stuffed casing.

This application discloses an improvement upon the apparatus disclosed in co-pending application Serial No. 359,137, filed June 2, 1953, now Patent No. 2,840,852. Applicant claims the benefit of the filing date of application Serial No. 359,137 for all subject matter common to the two applications.

The invention has among its objects the provision of a novel, more easily operated and more completely automatic apparatus for sealing filled casings.

Another object of the invention is the provision of improved mechanism for automatically feeding fastener members from a magazine to the zone at which the fasteners are assembled and clenched upon a neck of a casing.

Yet another object lies in the provision of improved mechanism for placing the filled casing and its contents under longitudinal tension preliminary to and during the fastener-affixing operation.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a view in perspective showing one form of sausage casing sealing apparatus made in accordance with the present invention;

FIG. 2 is an enlarged fragmentary view partially in side elevation and partially in vertical section through the apparatus at the upper end thereof, the upper fastener-applying die being shown in its upper retracted position;

FIG. 3 is a fragmentary view of the upper end of the apparatus showing FIG. 2, FIG. 3 being partially a front elevational view and partially a vertical sectional view;

FIG. 4 is a view in side elevation of the upper end of the apparatus and showing the side of the apparatus opposite from that in FIG. 2;

FIG. 5 is a somewhat simplified schematic view of the linkage and plunger mechanism which operates the reciprocable upper die and the fastener feeding mechanism of the apparatus;

FIG. 6 is an enlarged fragmentary view of the apparatus of FIG. 5 at the fastener-applying and clenching zone thereof, certain of the parts being shown in vertical section;

FIG. 7 is an enlarged fragmentary view in front elevation of the fastener-applying dies of the apparatus;

FIG. 8 is a view in section through the upper die, the section being taken generally along the line 8—8 of FIG. 5, a fastener co-operating with the upper die being shown in phantom lines;

FIG. 9 is a view in perspective of one embodiment of fastener which may be employed with the apparatus of the invention;

Figure 1:
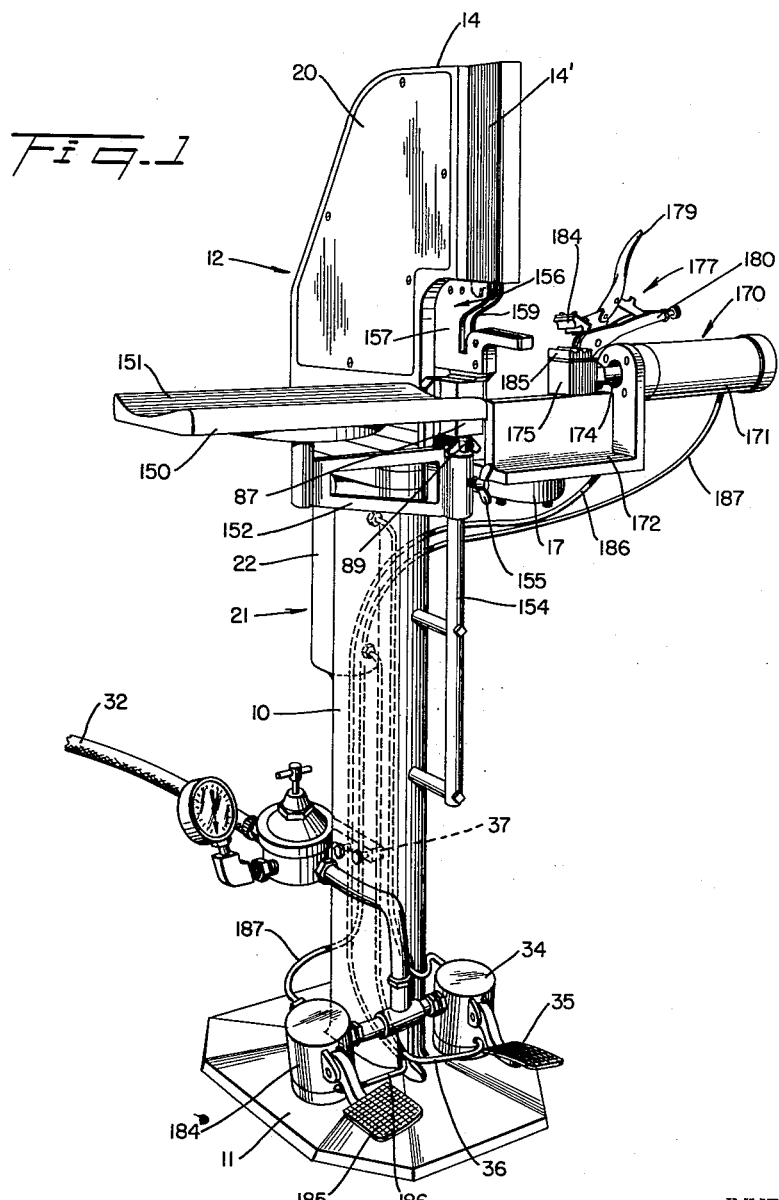

FIG. 10 is a fragmentary view in perspective of a portion of the apparatus at the lower, fastener-dispensing end of the fastener-feeding means, the fastener-transfer mechanism of the apparatus being shown in its lower, retracted position cooperating with the fastener-feeding means; and FIG. 11 is a fragmentary view in perspective of generally the same portion of the apparatus as that shown in FIG. 10, the parts of the apparatus being shown in FIG. 11 in their upper, fastener-transferring position.

The apparatus of the invention is in the form of a vertically disposed press having a column 10 supported on a base 11 which may rest on the floor. The column has secured to the upper end thereof a press head structure 12. Structure 12 is in the form of an open sided hollow upright frame 14, made for example as a casting, the frame being attached to the column by headed studs 15 which extend through laterally projecting base flanges 16 on frame 14, through an accessory-supporting horizontal plate 17, and are threaded into flanges 19 on the upper end of column 10. The press plunger, the operating linkage therefor, and the mechanism for automatically feeding deformable fasteners to the operating station where the fasteners are applied to a sausage and deformed to be secured thereto, all to be described, are contained within the frame 14. A detachable cover plate 20 is provided for the open side of frame 14.

The motive power for the press plunger and fastener feeding mechanism is supplied by a vertically acting fluid motor 21 having a vertical cylinder 22 secured to frame 14 by a hanger type bracket means 24, secured to flanges 16 as shown in FIGS. 2 and 4. Means 24 has a horizontal plate 25 with a central vertical hole through which a reduced diameter neck 26 on the upper end of cylinder 22 extends. A nut 27 overlying plate 25 has threaded engagement with the upper end of neck 26, thereby securing the cylinder to the bracket.

The motor 21 has a vertically reciprocable piston (not shown) in its cylinder 22, the piston having a piston rod 29 secured thereto. Piston rod 29 extends through a seal (not shown) at the upper end of cylinder 22, and is connected to the press plunger operating linkage by an adjustable link device 30. Motor 21 functions to impel the press plunger 31 in a downward, operative stroke when piston rod 29 rises, and functions to raise or retract the press plunger when the piston rod descends.

The motor 21 is of the air operated type. The motor is supplied with compressed air through a conduit 32 connected to a suitable source, compressed air being led to a valve 34 which in the embodiment shown is operated by a pedal 35 spring biased toward its upper position. Valve 34 selectively delivers air under pressure to the cylinder 22 below or above the piston through conduits 36 and 37, respectively, and simultaneously exhausts air from the other end of the cylinder. Preferably valve 34 is of such construction that when pedal 35 is in its upper position air under pressure is directed to the upper end of cylinder 22 through conduit 37, thereby to retract press plunger 31, and when pedal 35 is in its lower position air under pressure is directed into the lower end of cylinder 22, thereby to impel the press plunger in a downward, working stroke.

The press plunger 31 is vertically reciprocable in a cylindrical guideway 39 in frame 14, the guideway being located vertically above the fastener securing station. Plunger 31 has an elongated cylindrical portion 40 which accurately fits within and is reciprocably guided by guideway 39. Rising centrally above portion 40 of the press plunger is an ear 41 which is pivotally connected by links 42 to the forward end 44 of a rocker lever 45. Links 42 lie on either side of ear 41 and end 44 of lever 45, as shown, and are pivotally connected thereto, respectively, by pivot pins 46 and 47. Rocker lever 45 is pivotally mounted adjacent its mid-point on a horizontal stub shaft 49 affixed to press frame 14.

The rear arm 50 of rocker lever 45 is pivotally connected by a pin 51 to the upper end of an elongated link 52. The lower end of link 52 is pivotally connected by a pin 54 to a rocker plate 55 which is pivotally mounted on a horizontal stub shaft 56 affixed to press frame 14 at a location above and somewhat forwardly of the motor cylinder 22. Pivotally secured to a downwardly and rearwardly projecting ear 57 on rocker plate 55 by a pin 59 is an H-shaped link 60, the upper parallel ears of which are positioned on either side of ear 57. The lower ears of the link 60 are pivotally connected by a pin 61 to the upper end of the adjustable link device 30.

Device 30 has a body 62 into which the upper end of piston rod 29 is threaded. Suitable turning of the piston rod relative to body 62 serves to adjust the terminal positions of link 30, and thus of press plunger 31, relative to the terminal positions of the piston in cylinder 22. The piston rod 29 and body 62 are held in adjusted position by a lock nut 64 on the threaded end of the piston rod. The upper end of body 62 has an upstanding central ear 65, to which the lower end of link 60 is attached by the aforesaid pin 61. It will be seen, from the above description of the linkage that when piston rod 29 is vertically retracted the parts occupy the positions shown in FIG. 2, and that when piston rod 29 is fully advanced or raised the parts occupy the position shown in FIG. 5.

The fasteners 66 which the apparatus is designed to affix to sausages and the like are shown in FIG. 9. Such fastener, which is the subject of U.S. Patent No. 2,735,149, is generally of U-shape before it is applied and secured to a sausage. The fastener 66 has a body portion 67 which may be longitudinally corrugated, as shown. Along the sides of body 67 extend flanges 69, 70, which project outwardly from the body portion. The ends of the body 67, outwardly of flanges 69, 70, are reverse bent at 71.

The apparatus includes mechanism for automatically feeding fasteners 66, one at a time, in downwardly open position, to the upper fastener-applying die secured to press plunger 31, depositing a fastener at the upper die in fastener-retaining relationship therewith, whereby the fastener is carried by the upper die so as to embrace the end of a sausage casing and thereafter to be clenched about such end of the casing by the action of the upper die in cooperation with a lower fixed die carried by the machine frame. The upper die and its operating and guiding means, the lower die, and the fastener feeding will be described in that order.

In the embodiment shown, the upper forward portion of frame 14 bearing plunger 31 and the guideway therefor is made as a separate member 14' which is bolted to the main frame 14, as shown. The bolts for this purpose, not shown, have their heads lying inwardly of openings 72 in member 14', the threaded inner ends of the bolts being threadedly engaged in holes in frame 14. The lower portion 74 of plunger 31 is rectangular in horizontal section and of reduced thickness in a lateral direction, as shown in FIGS. 3 and 7. Secured to the lower end of portion 74 is an upper die 75, the die having a vertical shank 76 received in a bore 77 in the lower end of plunger portion 74 and retained therein by a set screw 79.

Die 75 has two similar laterally spaced side portions 80 (FIG. 8), each side portion having a downwardly open generally semi-circular recess 81 adapted to receive the central body portion 67 of a fastener 66 in the position shown in FIG. 9. The outer edge of each portion 80 of the die is recessed at 82 to receive therewithin the respective flange 69, 70 on fastener 66.

A lower die 84 is secured to the frame of the machine in vertical alignment with the upper die 75. Lower die 84 is supported on an anvil 85 which, as shown in FIGS. 2 and 3, is bolted to the forward face of frame 14. Die 84 is retained on anvil 85 by a shank 86 which extends through a hollow boss 87 on the anvil. The lower end of shank 86 is threaded, and receives a wing nut 89 which holds the die down on the anvil. The die 84 has two similar upstanding forward and rear portions 90 of such width as to be receivable between the depending lower ends of side portions 80 of the upper die 75. Portions 90 of the lower die have their upper surfaces of a curved cam contour, the forward and rear portions 91 thereof being mirror images of each other. The dies 75 and 84 interact, upon their relative approach, to deform a fastener 66 and to clench it about the neck portion of a sausage in the manner shown in FIG. 8 of Frank Patent No. 2,735,149.

The mechanism for feeding fasteners 66 automatically into position to be applied over the neck of a sausage casing and thereafter to be deformed and clenched therabout by dies 75 and 84 is shown more particularly in FIGS. 2, 4, 5, 10 and 11. As shown in FIG. 4, a replaceable magazine 92 having a plurality of sequentially arranged fasteners 66 (not shown) therein disposed with their bights uppermost is supported on a bracket 94 affixed to one side of the press head frame 14. The magazine, which may be removed and replaced by a filled one when empty, is disposed at a marked angle to the horizontal, and in alignment with an inclined track-like fastener-guiding member 95 the outer free end of which is supported on a bracket 96 similar to bracket 94. The fasteners 66 emerging from magazine 92 are received upon member 95, as shown, and slide down such member with their leg portions on either side thereof. An elongated cover member 97, parallel to member 95 and suitably supported by bracket members 99 on the frame of the head, retain the fasteners upon member 95. The inner lower end of member 95 is smoothly curved through 90° and extends through an opening 100 in frame 14 so as to carry the fasteners into the proper position relative to the fastener-transferring mechanism (FIGS. 2, 5, 10, and 11). The lower end of member 95 slopes downwardly somewhat, as shown in FIGS. 10 and 11.

The transfer mechanism includes a first, upper transfer link in the form of a first-class lever having a long arm 101 and a short arm 102. Such first link is oscillatably mounted on a horizontal pivot pin 104 mounted on frame 14. A second, lower transfer link 105 is oscillatably mounted on pin 106 on frame 14. Pin 106 is disposed somewhat below and to the left (FIGS. 2 and 5) of pin 104. Link 105 is of the same length as arm 101 of the upper link member. The forward or outer free ends of link 105 and arm 101 are connected by a third, short link member 107 through the medium of pivot pins 109 and 110. The line between the axes of pins 104 and 106 is parallel to and of the same length as that between the axes of pins 109 and 110. The arm 101, link 107, and link 105 thus form at all times three consecutive sides of a parallelogram, and link 107 retains its same attitude in space regardless of its movement between its upper position, shown in FIG. 2, and its lower position, shown in FIG. 5. The transfer mechanism is such that the fastener-carrying head member thereof moves between an upper die loading position between the dies and a head member loading position laterally removed from the path of action of the dies.

Integral with link 107 is a transfer head member generally designated 111, the construction of which will be more readily apparent in FIGS. 10 and 11. As there shown, the transfer head is formed as an upstanding extension 112 on head 111, extension 112 being of such section at its upper end 114 as freely slidably to receive a fastener (designated 66' while being received thereupon and transferred to the upper die 75). Upper end 114 is conveniently formed to have the same section as that of guide member 95, so that when member 114 is positioned in alignment with member 95 as in FIG. 10 the end fastener will slide smoothly from member 95 to member 114. Upper end 114 of member 112 has a width in the direction of travel of the fasteners thereto which is slightly less than that of a fastener. A transverse plate member 115 having ends overlying the paths of the respective legs of the fasteners prevents the feeding and transfer of more than one fastener at a time.

The link 107 and the members 111, 112, and 114 attached thereto are automatically operated to move them into the lower, retracted position of FIGS. 5 and 10 when the upper die 75 is in its lower, fastener-clenching position, and to move them into the upper, extended transfer position of FIGS. 2 and 11 when the upper die 75 is fully raised. Such timed movement of the transfer mechanism is effected, in the illustrative embodiment, by a drive link 116 pivotally connected at its rear end to an intermediate zone of rocker plate 55 by a pivot pin 117 and at its forward end to the rear end of arm 102 of the upper transfer link. As the plate 55 rotates clockwise (FIG. 2) to drive upper die 75 downwardly, the upper transfer link is likewise rotated clockwise to move it toward its fully retracted position (FIG. 10).

Associated with the transfer mechanism are means whereby the fasteners are fed one at a time to head 114, the remainder of the fasteners are automatically retained from escape from the stack of fasteners, and the transferred fastener is temporarily retained in the upper die until, after being carried downwardly by the upper die, the fastener is clenched about the neck of the sausage casing.

Mounted upon the frame 14 of the apparatus is a vertically reciprocable fastener stop finger 120, which is positioned so that its lower end lies between the flanges and engages the further flange of the second fastener from the end of the row of fasteners when the parts are disposed as in FIGS. 2 and 10. Such second fastener, as shown, is spaced somewhat along the path of feeding of the fasteners from the end fastener 66'. Finger 120 is reciprocably mounted on a headed stud 122 which is screwed into frame 14 and extends through a slot 124 in finger 120. A transverse pin 125 fast to finger 120 at an upper zone thereof projects into a vertical guiding slot (not shown) in frame 14 to maintain the finger in vertical position. A coil compression spring 126, acting between the pin 125 and an abutment (not shown) on the frame 14 constantly urges the finger 120 downwardly. The finger 121 is retracted vertically, to clear lower end 120 thereof from the path of feeding of the fasteners, by the arm 101 of the upper transfer link as the latter swings upwardly toward the position of FIG. 11. Such retraction is effected by engagement between the upper surface of arm 101 and a vertically disposed adjustable abutment 127 disposed in vertical alignment with arm 101 and having threaded engagement with a sidewardly bent, horizontal upper terminal portion 129 on finger 120. A lock nut 130 retains abutment 127 in the desired adjusted position. The arrangement and the adjustment of the parts is such that lower end 121 of stop finger 120 travels downwardly to engage the second fastener in line in the manner shown in FIG. 10 before the first fastener 66' in line has been released from guide member 95.

Secured to frame 14 at a position somewhat rearwardly of finger 120 is a mounting block 131 for a depending stop spring 132. The spring 132 has a forwardly bent finger 134 lying at a level intermediate the ends of the rear leg of fasteners 66 in their path of feeding. In its relaxed condition spring 132 hangs generally vertically from block 131, and finger 134 engages the forward flange of the first fastener on guide member 95 (FIG. 11). Thus when the parts are in the position of FIG. 11 the stack of fasteners 66 is prevented from escape from guide member 95 by finger 134.

The arm 101 of the upper transfer link is provided with a transverse pin 135 fast thereto, the path of the end of pin 135 projecting from arm 101 being disposed in alignment with an intermediate portion of spring 132. As the parts approach the terminal position of FIG. 10 pin 135 engages spring 132 to bend it rearwardly, whereby finger 134 is retracted from the path of feeding of the fasteners. By the time finger 134 has moved sufficiently to release the end fastener, however, the head member 114 will have been presented substantially in alignment with the end of guide member 95, so that the endmost fastener is received upon head member 114.

As above set forth, the fasteners 66 slide down the guiding member 95 under the action of gravity. As the endmost fastener is being removed from the stack of fasteners on member 95 by the head member 114, the fastener 66' remains held in the position shown in FIG. 10 by member 120, 121. At that time the detent member 134 is removed from the path of the stack of fasteners, as shown in FIG. 10. When the head member 114 begins its travel laterally and upwardly toward the upper die, as shown in FIG. 5, detent member 134 approaches the end of the stack of fasteners. When the end fastener has been completely removed from the stack of fasteners by head member 114, detent member 134 is then in the position shown in FIG. 11 so as to be in a position to intercept and hold the next fastener in the stack. When the head member 114 has reached its uppermost position, as shown in FIG. 11, member 120, 121 is raised by the action of lever 101, thereby to allow all of the other fasteners in the stack to advance into the position shown in FIG. 11. As was disclosed above, the guiding member 95 is inclined throughout its length so that the fastener then at the end of the stack slides under the action of gravity onto the head member 114 when such head member is again presented to the end of guiding member 95 and the detent member 134 has again been retracted as shown in FIG. 10.

It will thus be seen that the apparatus provides for the transfer of one fastener to head member 114 each time the upper die 75 completes its downward stroke. Such fastener, designated 66', is swung forwardly and upwardly by head member 114 into the position of FIGS. 2 and 11 as the upper die 75 completes its upward, return stroke. In the upper position of head member 114 it is received within the upper die 75 (FIG. 2) and transfers the fastener 66' supported thereon to die 75 for temporary retention by the latter.

As shown in FIGS. 6, 7, and 8, the upper die 75 is provided with a yieldable latch member 136, whereby the transferred fastener is retained in the upper die when the head member 114 is retracted therefrom at the start of the downward operative stroke of the upper die and is released by the latch member after the upper die has completed its operative stroke to clench the fastener, and has started its upward, return stroke. Latch member 136 is generally of inverted L-shape, the free end of its horizontal leg 137 being received in a vertical slot in the body of the upper die 75 below shank 76 thereof. The free end of leg 137 is pivotally attached to the upper die by a horizontal pivot pin 140. A light coil compression spring 141 disposed in a blind vertical passage 142 extending upwardly into shank 76 constantly urges latch member 136 counterclockwise (FIGS. 7 and 8) toward its unloaded position shown in FIG. 7.

The generally vertically depending leg 144 of latch member 136 has a hook-like formation 145 open toward the upper portion of the fastener-engaging portion of die 75. The lower outer end surface 146 of formation 145 is in the form of a cam surface which inclines downwardly and to the left when the latch member is disposed as in FIG. 7. The construction and arrangement of the latch member 136 is such that when a fastener is presented vertically to die 75 by head member 114 the flange on the fastener engages cam surface 146 on the latch to cause the latch to pivot clockwise to allow the confronting upper edge of the fastener to pass by the lower end of the latch member, and, after the fastener has been fully raised relative to the die 75 and head 114 has begun to be lowered, for the lower end of the hook-like formation 145 to snap inwardly below the portion of the fastener at the upper end thereof. As shown in FIGS. 7 and 8, the upper die 75 is provided with parallel ribs which engage the outer surface of the fastener between the flanges 69, 70 of the latter. Such ribs prevent any undue misalignment between the fastener and the die 75. Frictional engagement between die 75 and the fastener causes the fastener to remain in substantially its uppermost position within the die when the head 114 is retracted downwardly, thereby providing space between the lower, inner surface of the fastener and the upper end of head 114 into which the lower end of the hook-like formation 145 can snap as described. Such retention of the fastener by the latch member, taken in conjunction with the engagement of the fastener by die 75, is sufficient to retain the fastener stably on die 75 as such die performs its downward, operative stroke. The coil compression spring 141 has a relatively small compressive strength; this fact, plus the cam-like lower surface 146 on depending leg 144 of latch member 136, allows such latch member to be thrust clockwise (FIGS. 7 and 8) by the fastener on head member 114 without disturbing the positioning of the fastener on such head member. In other words, the lateral force exerted upon the fastener on the head member is less than the force of frictional engagement between the head member and the fastener positioned thereon.

After the fastener has been clenched about the neck 147 of a sausage, however, as indicated at 66″ in FIG. 6, upward movement of die 75 causes latch member 136 to pivot clockwise against the action of spring 141 by the camming movement of the lower end 146 of latch member 136 upwardly along the clenched fastener 66″ to allow the latch member to be released from the clenched fastener.

The sausage 149 whose neck 147 is shown being sealed (FIG. 3) by the apparatus of the invention, is conveniently supported on a horizontal table 150 having a concave upper surface 151 aligned with the vertical axis of the upper die 75 and the lower die 84, as shown most clearly in FIG. 1. To allow the apparatus conveniently to process sausages of different diameters, the table 150 is preferably supported so that it is vertically adjustable. Thus, in the apparatus shown, the table 150 is supported on the outer end of an arm 152 the inner end of which is slidable vertically along a vertically disposed rod 154 affixed to the column 10 at the front thereof. A set screw 155 having threaded engagement with the inner end of arm 152 and bearing upon rod 154 secures the table 150 in the desired adjusted vertical position. The table 150 may thus readily be adjusted to bring the longitudinal axis of the sausage into alignment with the position which the fastener will have after it has been clenched upon the neck of the sausage.

In order to insure that the sausage casing is completely filled, and that all air has been expelled from the casing before the fastener is clenched about the neck of the casing, the apparatus is provided with a broad surfaced abutment member which is interposed between the end of the sausage being sealed and the neck of the casing, and means to engage the outer free end of the neck and to pull it so as to press the sausage strongly against the abutment prior to and during the sealing of the casing neck.

The broad surfaced abutment member is generally designated 156. The abutment 156 is made of two generally parallel, generally plate-like members bolted together, the one such member confronting the sausage being designated 157, and the other such member being designated 159. As shown in FIGS. 3 and 7, members 157 and 159 present a vertically extending space between them within which is received the lower die 84 and the upper die 75. The abutment 156 is generally of C-shape, and has a forwardly open wide mouth which narrows rearwardly into a vertically disposed sausage container neck-receiving slot 160 extending transversely therethrough in alignment with the vertical axes of dies 75 and 84. The sausage-confronting edges of the mouth and slot 160 in abutment member 156 are smoothly rounded to avoid puncturing or tearing of the sausage casing. The abutment 156 is mounted so as to be reciprocable vertically throughout a limited range, for purposes to be described, being retained on frame part 14′ by a headed stud 161 threaded into frame 14 and extending through a vertically extending slot 162 in a cleat member 164 affixed to the upper edge of member 159, and by a headed stud 165 threaded into anvil 85 and extending through a vertically extending slot 166 in a lower flange member 167 integral with member 159. See FIGS. 3 and 4.

The abutment 156 is constantly urged into its upper position, determined by its engagement with the lower edge of frame member 14′ (FIG. 3) by a coil tension spring 169 acting between a pin 170′ affixed to frame 14 and a block 171′ affixed to member 159 adjacent its upper edge. The lower terminus of the travel of abutment 156 is determined by a stop member 163 affixed to anvil 84 by a stud 168, such stop member being contacted by the lower surface of a shallow laterally projecting flange 173 (FIG. 7) on plate 157 of the abutment member 156. Such construction is shown most clearly in FIGS. 6 and 7.

The parts are so constructed and arranged that the lower end of slot 160 in abutment 156 is disposed a short distance above the position occupied by the lower surface of neck 147 of the sausage casing upon the clenching of the fastener, as shown in FIG. 6, when the abutment 156 is in its uppermost position. The application of the fastener to the neck of the container and the clenching of the applied fastener by die 75 causes the abutment 156 to be thrust downwardly with such neck against the action of spring 169. Upon the release of the clenched fastener by die 75, as the latter is retracted, the spring 169 causes the abutment 156 to raise the container neck, with the clenched fastener thereon, to free it from lower die 84. Thereupon, the sealed sausage may readily be removed from the apparatus.

In order to apply a strong pull on the portion of the neck 147 of the sausage casing projecting through the slot 160 in abutment 156, the apparatus of the invention is preferably provided with a powered casing pulling mechanism. The mechanism shown for this purpose includes a fluid operated motor 170 having a horizontally disposed cylinder 171 fixedly secured to an inverted T-shaped bracket member 172 affixed to supporting plate 17. Motor 170 has a piston (not shown) reciprocable in cylinder 171 and a piston rod 174 secured to the piston. The cylinder 171 is so disposed that the axis of piston rod 174 lies in the central vertical transverse plane of slot 160 in abutment 156.

A head 175 is affixed to the outer end of piston rod 174.

Conveniently the lower surface of head 175 has substantially sliding engagement with the upper surface 176 of the central web of bracket 172, so as to protect the piston rod from undue downward deflection. Secured to the upper surface of head 175 is a gripper device 177 by means of which the end of the protruding neck portion 147 of the sausage casing is made fast to piston rod 174. The gripper device shown is in the form of an adjustable toggle-operated plier type wrench having opposed handles 179 and 180, and opposed jaw-mounting portions 181 and 182. Opposed jaws 184 and 185 are mounted on portions 181 and 182, respectively. The jaws are provided with broadly serrated confronting gripping surfaces, the teeth on one of the opposite jaws intercalating with those of the other jaw. The peaks and valleys of the serrations are smoothly rounded, to prevent puncturing or tearing of the casing neck material. The piston rod 174 is extended and the jaws are opened (FIG. 3) after a sausage to be sealed has been mounted in the apparatus and neck 147 thereof has been placed through the slot in abutment 156. Alternatively, the piston rod may first be extended and the jaws of the gripper opened before the sausage has been placed on table 150 with neck 147 extending through the slot in the abutment. Thereupon jaws 181 and 182 are closed, and piston rod 174 is impelled away from the abutment.

Fluid under pressure is supplied to cylinder 171 from source 32, such fluid being distributed to the cylinder by a foot-operated reversing valve 184'. The valve 184' is provided with a foot pedal 185, and is preferably so arranged that when the operator's foot depresses the pedal fluid under pressure is fed to the near end of cylinder 171 through conduit 186 and is exhausted from the far end of the cylinder through conduit 187, and that when the operator's foot is removed from the pedal fluid under pressure is fed to the far end of the cylinder through conduit 187 and is exhausted therefrom through conduit 186. This places the tensioning of the sausage casing under the complete control of the operator. It will be understood, however, that if desired the connections between the valve 184' and cylinder 171 may be reversed, so that the gripper normally in its outer, extended position when the operator's foot is removed from the pedal and is brought into its inner position only when pedal 185 is depressed.

The jaws 184 and 185, although non-slippingly engaging the neck of the casing, do not seal the neck against the egress of air through the neck as the filled casing is pulled to the right in FIG. 3 against the abutment. The pulling of the filled casing against the abutment means 177 compacts the filling in the casing and causes any air trapped therein to be forced out through the neck of the casing. Such action would take place, even if jaws 184 and 185 should seal the neck of the casing, which they do not, because the jaws are somewhat spaced from the abutment and thus provide an air-receiving space in the neck of the casing outwardly of the abutment.

It is believed that the manner of operation of the illustrative embodiment of the apparatus in accordance with the invention will be clear from the above description. However, the cycle of operation of the apparatus will be briefly recapitulated.

It will be assumed that a magazine filled with fasteners 66 has been mounted on the apparatus as shown in FIG. 4, and that the fasteners have been fed so that they are disposed as shown in FIG. 10. It will also be assumed that table 150 has been adjusted to the desired vertical position for a run of sausages of a predetermined diameter which are to be sealed. The sausage casing is then sealed at a first end; this has preferably been already done for the required number of sausage casings. The thus prepared casings are filled with the proper amount of material such as meat, and are then presented in sequence to the sealing apparatus of the invention.

The sausage is preferably presented to table 150 from the front of the apparatus, the neck 147 of the casing being introduced into the mouth of the slot in abutment 156 and thence into the vertical portion 160 of the slot. Preferably, as above explained, the piston rod 174 is in extended position at that time, and the jaws of gripper 177 are open to receive the outer end of the casing neck. The jaws of the gripper are then closed and locked, and the gripper is thrust away from abutment 156, to place the casing under a predetermined tension, by depressing pedal 185 of valve 184'.

It will be assumed that the upper die 75, which is now in its raised position, has a fastener 66 therein, presented thereto by previous action of the fastener transfer mechanism. While the neck of the sausage is retained under tension by fluid motor 170, the pedal 35 of valve 34 is now depressed, whereby to cause fluid motor 21 to thrust the upper die downwardly. Simultaneously with the downward travel of die 75, the fastener transfer member 111 moves downwardly and sidewardly away from the upper die, leaving the fastener previously deposited in such die held in the die by latch 136 and being withdrawn laterally from the path of further downward travel of die 75. The fastener retained by the die is carried downwardly to be telescoped about the neck 147 of the sausage casing and clenched sealingly thereabout by the action of upper and lower dies 75 and 84. During the final portion of the travel of die 75 the downward thrust on the neck 147 causes the neck forcibly to engage the bottom of slot 160 in abutment 156, thereby depressing the abutment against the action of spring 169. The pedal 35 is then released to raise the upper die.

In the initial portion of the return stroke of the upper die, the spring 169 raises the abutment 156 to free the clenched fastener from the lower die 84. Further rising of the die 75 causes latch 136 to yield, thereby freeing the clenched fastener from the upper die. After the fastener has been clenched, the pedal 186 is released and then the gripper 177 is opened. When die 75 has risen sufficiently to clear the upper end of slot 160 the sealed sausage may be removed from the apparatus. Preferably the end of the neck beyond the clenched fastener is then cut off.

During the downward stroke of the upper die the fastener transfer mechanism moves from the position of FIG. 11 to that of FIG. 10. The initial downward pivoting of arm 101 causes finger 120 to be depressed into fastener-holding position. Near the lower end of the pivotal movement of arm 101, and after the transfer head member 114 has reached a position partially overlapping guiding member 95, the pin 135 on arm 101 deflects spring 132 to withdraw fastener-retaining finger 134. When member 114 is fully aligned with the end of guiding member 95 the first or end fastener member 66' slides onto member 114, being aided in its travel by the weight of the next fastener as it slides down the slightly inclined end portion of guiding member 95.

As the die 75 begins to rise, the arms 101 and 105 begin to turn counterclockwise from the position of FIG. 10. Before member 114, which now carries fastener 66', has moved wholly out of alignment with the end of guiding member 95, pin 135 will have moved sufficiently for retaining finger 134 to engage the flange on the first fastener now in line on guiding member 95, thereby retaining the whole stack of fasteners until the finger 120 takes over, near the upper limit of travel of arm 101, the function of retaining all but one of the fasteners in the stack.

Although only one embodiment of the invention has been illustrated in the accompanying drawings and described in the foregoing specification, it is to be expressly understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. Sealing means for sausage casings comprising a plunger movable downward toward an anvil, a first die on the plunger, said plunger first die being bifurcated at opposite ends and having an intermediate punch surface conforming to the shape of a curved fastener having an open side, means comprising a spring finger mounted on the first die, said finger acting releasably to hold a fastener in fastening position, and allowing the fastener to be withdrawn from the plunger after being affixed to the casing, and a second die positioned on the anvil in opposition to the first die, said second die having ears fitting the bifurcations of the first die and a cam surface for shaping the fastener as it is applied.

2. Apparatus including mechanism for feeding a plurality of similar articles one at a time between opposing dies which are relatively movable toward and away from each other, said mechanism comprising means supporting a stack of the articles and presenting them in a line terminating at a transfer loading station, article-engaging essapement means at the loading station, a transfer die movable from the loading station to a position between the dies, a first one of the dies having a means which receives and temporarily retains an article from the transfer head when the dies are retracted from each other, means for driving the transfer head in timed relationship with the dies, said last-named means comprising a pivotally mounted oscillatory lever mounting and driving the transfer head, the transfer head being movable laterally out of the path of the dies before both dies engage the article, and means to maintain the transfer head in a constant angular position in space throughout its oscillation from the loading station to the said first die.

3. Apparatus including mechanism for feeding a plurality of similar articles one at a time between opposed dies which are relatively movable toward and away from each other, said mechanism comprising means supporting a stack of the articles and presenting them in a line terminating at a transfer loading station, article-engaging escapement means at the loading station, a transfer head movable from the loading station to a position between the dies, a first one of the dies having a means which receives and temporarily retains an article from the transfer head when the dies are retracted from each other, means for driving the transfer head in timed relationship with the dies, said last-named means comprising a first lever for supporting and driving the transfer head, means pivotally mounting said first lever, means pivotally mounting the transfer head on said first lever, the transfer head being movable laterally out of the path of the dies before both dies engage the article, and means to maintain the transfer head in a constant angular position in space throughout its oscillation from the loading station to the said first die.

4. Apparatus as defined in claim 3, comprising a second oscillatory lever mounted parallel to the first lever, means pivotally mounting said second lever, and pivotally connecting the transfer head to said second lever, the portions of the first and second levers beyond their pivotal mountings and the portion of the transfer head between the points of pivotal attachment of the levers thereto forming three consecutive sides of a four-sided parallelogram.

5. Apparatus including mechanism for feeding a plurality of similar generally U-shaped fasteners one at a time in inverted position between opposed dies which are relatively movable vertically toward and away from each other, said mechanism comprising means supporting a stack of the fasteners in inverted position and presenting them in a line terminating at a transfer loading station, fastener engaging escapement means at the loading station, a transfer head receiving the fasteners one at a time as a cap thereover and movable from the loading station to a position between the dies, and means for driving the transfer head in timed relationship with the dies.

6. Apparatus including mechanism for feeding a plurality of similar generally U-shaped fasteners one at a time in inverted position between opposed dies which are relatively movable vertically toward and away from each other, said mechanism comprising means supporting a stack of the fasteners and presenting them in a line terminating at a transfer loading station, said last named means comprising a rail which the fasteners straddle and along which they slide, fastener-engaging escapement means at the loading station, a transfer head movable from the loading station to a position between the dies, the transfer head having an upper end portion with a section similar to that of the rail, the transfer head being presented to the end of the rail at the transfer station so as to form a prolongation thereof during the feedings of a fastener onto the transfer head, and means for driving the transfer head in timed relationship with the dies.

7. Apparatus as defined in claim 6, wherein the escapement means comprises fastener engaging fingers both of which respectively engage two consecutive endmost fasteners in the stack thereof through the major, central portion of the movement of the transfer head, and means to retract the finger engaging the endmost fastener when the transfer head at least partially overlies the end of the stack supporting rail.

8. Apparatus including mechanism for feeding a plurality of similar generally U-shaped fasteners one at a time in inverted position between opposed upper and lower dies, the upper one of said dies being movable and the bottom die being fixed, said mechanism comprising means supporting a stack of the fasteners in inverted position and presenting them in a line terminating at a transfer loading station, fastener-engaging escapement means at the loading station, a transfer head movable from the loading station to a position between the dies, the transfer head being movable upwardly into close cooperation with the movable die when the latter is retracted, the upper die including means for temporarily retaining thereon a fastener presented to it by the transfer head, and means for driving the transfer head in timed relationship with the dies.

References Cited in the file of this patent

UNITED STATES PATENTS

| 2,265,277 | Gerke | Dec. 9, 1941 |
| 2,685,394 | Rabinowitz | Aug. 3, 1954 |
| 2,694,198 | Frank | Nov. 16, 1954 |
| 2,709,255 | Frank | May 31, 1955 |
| 2,716,751 | Kelem | Sept. 6, 1955 |
| 2,733,564 | Frank | Feb. 7, 1956 |
| 2,748,389 | Buchy | June 5, 1956 |
| 2,756,428 | Kellersman | July 31, 1956 |
| 2,840,852 | Frank | July 1, 1958 |
| 2,879,512 | Tipper | Mar. 31, 1959 |
| 2,908,909 | Stolecki | Oct. 20, 1959 |

FOREIGN PATENTS

| 781,770 | Great Britain | Aug. 28, 1957 |